United States Patent [19]

Hungerford

[11] Patent Number: 4,457,240
[45] Date of Patent: Jul. 3, 1984

[54] HAND HELD AND/OR HARD MOUNTED WEATHERPROOF PORTABLE TRAVEL SAFE FOR FULL TIME PROTECTION OF ESSENTIAL TRAVEL VALUABLES

[76] Inventor: Robert E. Hungerford, P.O. Box 66158, Seattle, Wash. 98166

[21] Appl. No.: 392,171

[22] Filed: Jun. 25, 1982

[51] Int. Cl.³ ............................................. E05G 1/00
[52] U.S. Cl. ...................................... 109/45; 109/50; 109/72; 211/71; 70/63
[58] Field of Search ............... 109/45, 50, 52, 59 T, 109/71, 72; 248/131; 206/0.8, 0.82; 70/63; 220/210; 211/71

[56] References Cited

U.S. PATENT DOCUMENTS

| | | | |
|---|---|---|---|
| 1,985,869 | 12/1934 | Millice | 109/45 |
| 2,794,554 | 6/1957 | Donner | 211/71 |
| 3,292,779 | 12/1966 | Colella | 206/0.82 |
| 3,436,937 | 4/1969 | Barrett | 70/63 |
| 3,610,176 | 10/1971 | Fujiki | 109/52 X |
| 4,284,014 | 8/1981 | Kuhn | 109/50 |

*Primary Examiner*—Robert P. Swiatek
*Attorney, Agent, or Firm*—Roy E. Mattern, Jr.

[57] ABSTRACT

A portable strong weather proof travel safe used by travelers to keep their essential valuables under their personal control enroute to and from a destination and/or while staying there. When not holding the travel safe, they lockably secure it to well anchored strong structures in guest rooms, rental cars, airports, parks, beaches, etc. In one embodiment, a strong cylindrical weatherproof compartment with a full top entry has integral bottom interfitting receiving structure adapted for securement to complementary receiving structures located in traveler facilities, a first rotatable then lift off strong weatherproof cover fully fitting over the full top entry, and locking mechanism to prevent the unwanted first rotation and then lifting off of the strong weatherproof cover, thereby preventing access to the contents and/or to the secured interfitted receiving structures, so they will continue to keep the travel safe well secured to the complementary receiving structure of a travel facility. In another embodiment, only the strong weatherproof cover has interfitting receiving structure adapted for securement to complementary receiving structures. Also in another specific embodiment, both the strong cylindrical weatherproof compartment and the strong weatherproof cover each have their own respective interfitting receiving structure.

12 Claims, 9 Drawing Figures

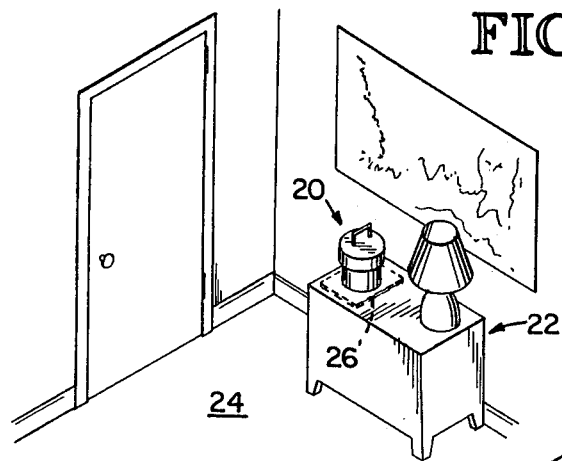
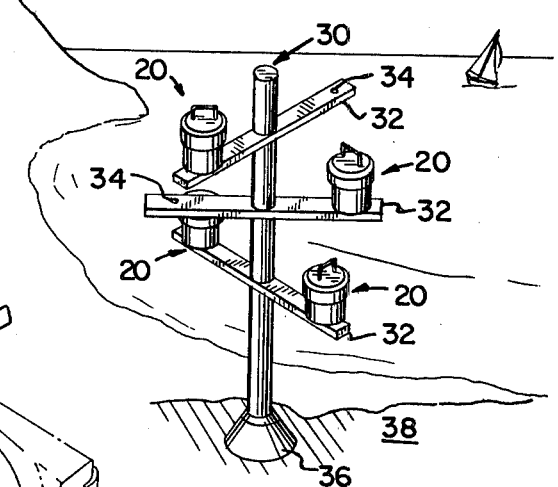
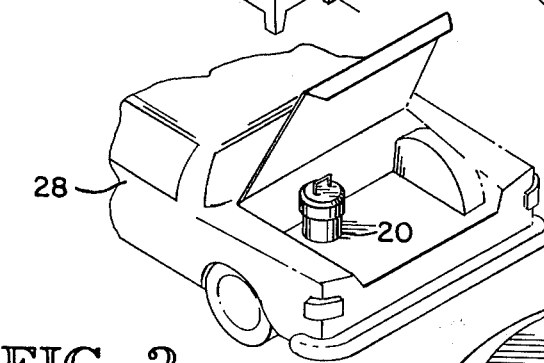
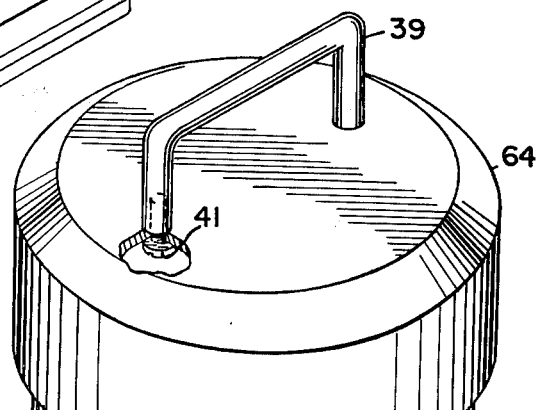
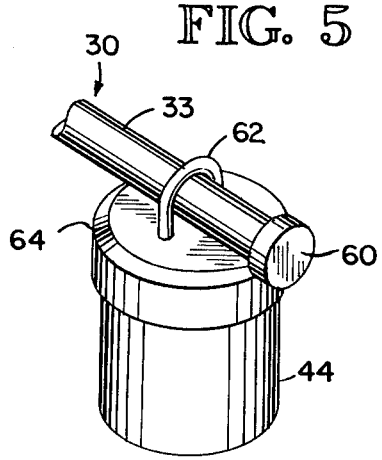
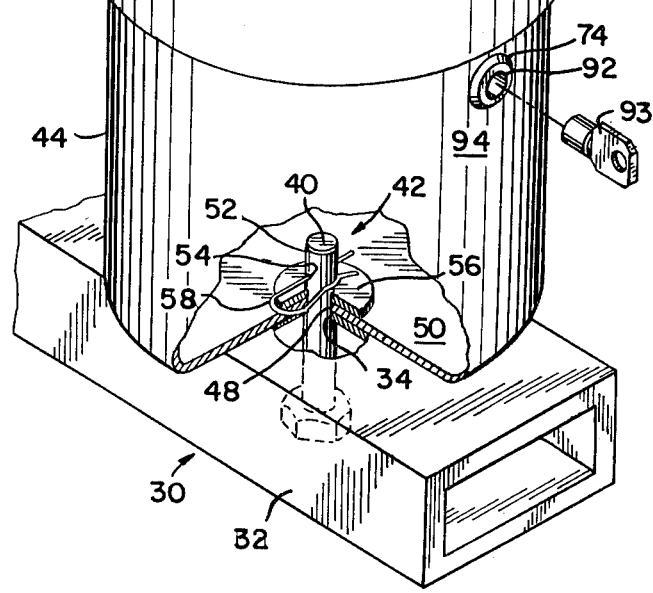

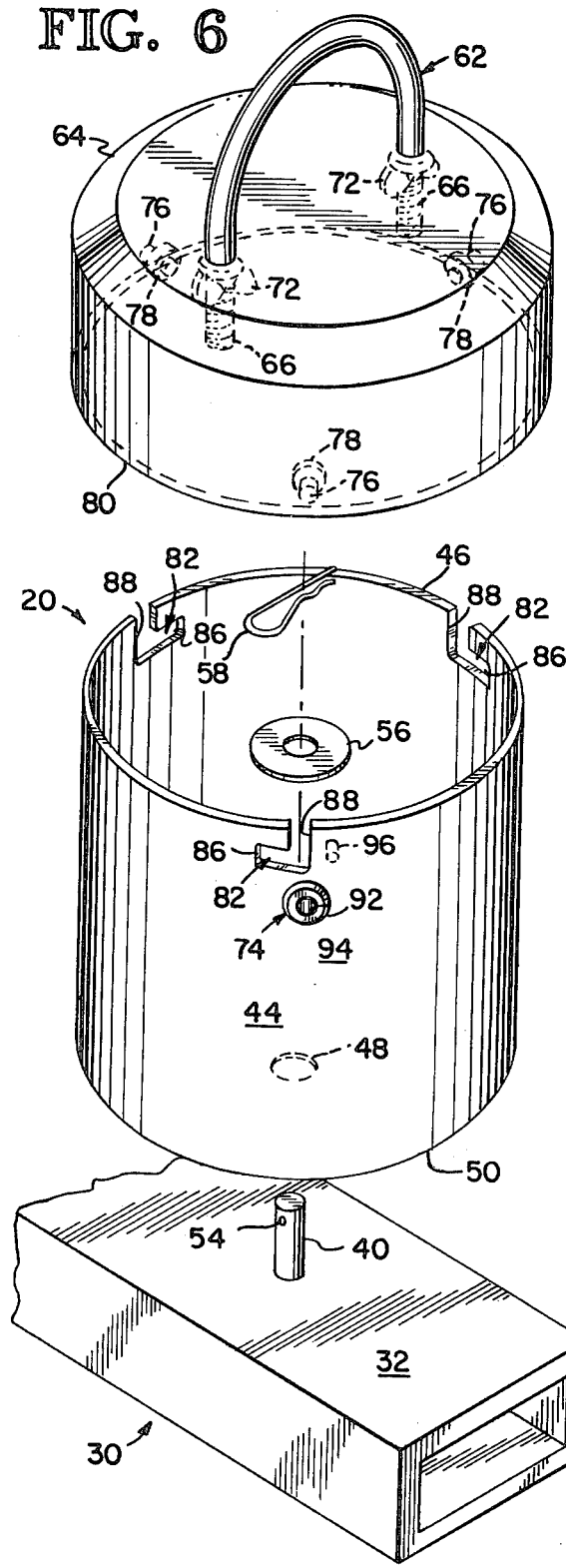
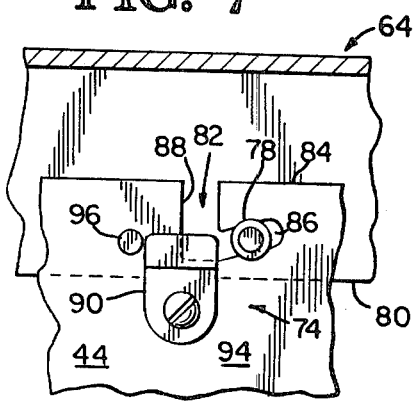
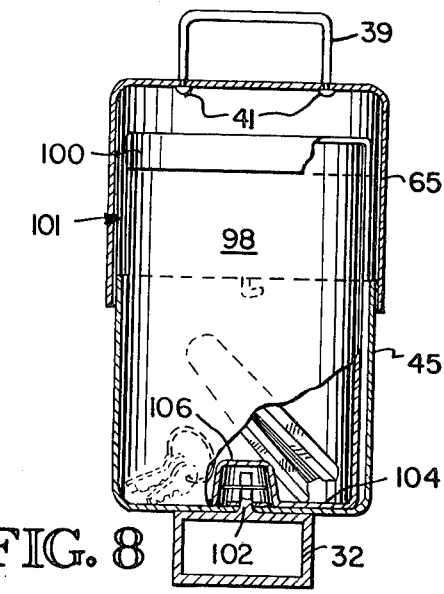
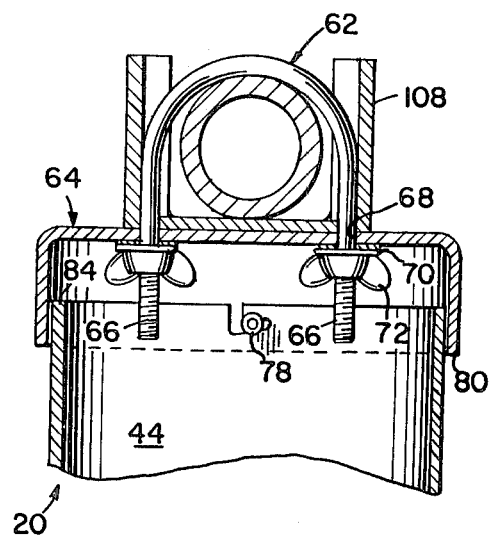

HAND HELD AND/OR HARD MOUNTED WEATHERPROOF PORTABLE TRAVEL SAFE FOR FULL TIME PROTECTION OF ESSENTIAL TRAVEL VALUABLES

BACKGROUND OF THE INVENTION

Lockable facilities are available to travelers for the securement of their valuables when they reach established lodgings, generally in a central office location. However, enroute to or from a destination, and while there, often touring nearby in rental cars, shopping, stopping at scenic spots, such as beaches, parks, etc., there are not now known commercially offered and coordinated security systems for the safekeeping of the traveler's valuables, such as cash, checks, credit cards, airline tickets, jewelry, hotel room keys, cameras, etc.

In the past, with respect to portable lockable facilities for travelers, Peter Morell in his U.S. Pat. No. 2,010,877 provided a safe box for motor vehicles. One locking mechanism secured a cylindrical compartment of the safe box to its cylindrical receiver, which was in turn secured by fasteners to the steering column of the vehicle. Another locking mechanism secured a top to the cylindrical compartment. The fasteners holding the safe box on the steering column were only accessible when the cylindrical compartment was unlocked and then removed. Once Mr. Morrell's safe box was removed, it had to be hand held and/or eye monitored until its return to the cylindrical receiver and then relocked.

Also Delbert Williams in his U.S. Pat. No. 2,911,814, disclosed his portable safe utilizing a shackle lock to secure a receiving chamber to a pipe, which in turn was well secured at both its ends to a strong structure. The portable safe could also be unlocked from its securement to a pipe and then be carried by a traveler for securement to another well secured pipe at another location during his or her travels. When locked in position the receiving chamber entry was located at the bottom of the portable safe.

Morton Rubinstein in his U.S. Pat. No. 3,858,531, illustrates and describes his portable security container to be used by travelers throughout their journeys. In one embodiment it also served as a clothes hanger. A lockable side entry had to be opened to reach parts of fastener assemblies used in securing this portable security container, and to unload and to load a traveler's essential valuables through this side entry. Mr. Rubinstein said his portable security container provided a highly secure, electronically armed, portable security container, that was adapted to be securely affixed to an appropriate fixture at various locations, to provide a means for a traveler's safekeeping of valuables at such locations.

William Ehrlich as disclosed in his U.S. Pat. No. 1,901,904 provided a safe for money and other valuables which was secured to a post, in turn inbedded in concrete. The safe was cylindrical and bolted into place on the post. Inside the safe was a receiving container to hold coins, etc. The bottom of the safe had a removable and lockable full bottom cover holding the receiving container in place until it was withdrawn down through the bottom opening. The receiving container per se was not lockable during a possible travel enroute to any other possible like safe for storage of money and valuables.

Ronald H. Read in his U.S. Pat. No. 4,244,304, disclosed a security box and a mounting plate arranged so the same lock kept the security box locked itself and kept the security box indirectly locked to the mounting plate when no traveling was to be undertaken. If traveling occurred the security box could be carried while locked to another destination. Hopefully at the new location there would be a like mounting plate.

These patents appear to be representative of the prior patents, yet there are no known commercial portable safes to be hard mounted for travelers which have gained any extensive acceptance. Substantially all travelers today still carry their traveling valuables, subject to many chances they will be lost or stolen in whole or in part, or possibly ruined by adverse weather conditions.

SUMMARY OF THE INVENTION

For travelers a full time portable, and/or hard mounted, weatherproof, strong hand holdable, travel safe is available, via an overall coordinated system of receiving securements at different locales, to keep their essential valuables under their personal control enroute to and from a destination and while staying there. In each embodiment, a strong cylindrical, generally weatherproof, receiving compartment with a full top entry is selectively loaded with the traveler's valuables, such as cash, checks, travelers' checks, credit cards, airline tickets, jewelry, hotel room keys, cameras, lens, etc. Thereafter a first rotatable then lift-off strong, generally waterproof cover is fully fitted over the full top entry strong cylindrical waterproof receiving compartment. A locking mechanism is then operated to prevent the unwanted first rotation and then lifting off of the strong waterproof cover. The traveler's full time portable waterproof, strong, hand holdable travel safe is ready for hand transport to a new location.

Once at a designated location, this traveler's full time portable safe is unlocked, so its self contained complementing securement subassembly is arranged to be intersecured with a complementing securement unit at a beach, park, hotel room, airport, dining room, rental car, etc. Thereafter, after perhaps redesignating the valuables to be secured, the locking mechanism is operated to keep the top and the receiving cylinder together, and eliminating access to the interior securement subassembly and the securement unit at a designated locale, so this travel safe remains firmly locked in place.

Optionally, in respective embodiments of this travel safe, the full top entry compartment and/or the top are lockably involved with respect to the interior securement subassembly, Moreover, optionally, a clear plastic waterproof inner container, with or without a top may be used for removable placement just inside the travel safe to directly hold the traveler's valuables, for their lift out clear observation, selection, and/or independent unlocked limited transport. Such a clear plastic inner container in one embodiment is formed to fit over the self contained complementary securement subassembly and to create a fully encompassing waterproof inner container for the valuables, when a small access hole is intentionally provided in the outer bottom of the travel safe, as part of the overall self contained complementary securement subassembly, to receive a passing through securement member.

In one embodiment, where a shackle is used with the top, as part of a self contained complementary securement subassembly, hardened steel anti bolt cutter guards are secured to the top to protect the shackle, which also serves as a handle.

In all the embodiments, this travel safe is directed to preventing the otherwise successful robbery to be attempted by a criminal, who tries to quickly break in, quickly search, quickly select valuable items, and quickly leave. However, this travel safe does not replace the need for a massive, heavy, fireproof, waterproof, and vandal proof commercial safe. It is only intended to essentially protect the traveler's valuables, while he or she is traveling and keeping relatively close to his or her valuables, which are kept in hand, or nearby in vehicles, hotel rooms, beaches, parks, airports, etc.

DESCRIPTION OF THE DRAWINGS

Selected embodiments of the travel safe are illustrated in the drawings, wherein, FIG. 1 is a perspective view of a portion of a rental car indicating how a travel safe is secured a vehicle structure;

FIG. 2 is a perspective view of a portion of a hotel room indicating how a travel safe is secured to furniture;

FIG. 3 is a perspective view of a tree like strong support secured in concrete in the ground, indicating how travel safes are secured to the simulated branches of this tree-like strong support positioned at a park, beach, etc.;

FIG. 4 is a perspective view of a travel safe secured at its bottom to a simulated branch of a tree-like strong support, with portions removed to illustrate the complementing securement subassembly and the securement unit;

FIG. 5 is a perspective view of a travel safe secured at its top to another embodiment of a simulated branch of a tree-like strong support; wherein a capped round pipe is used;

FIG. 6 is an exploded view of an embodiment of the travel safe having securement subassemblies located at both the top and bottom;

FIG. 7 is an enlarged partial view of a travel safe illustrating how the top, when dropped into place and rotated, is then locked, with motion indicating arrows indicating the drop in and rotation of the cover relative to the cylinder, and indicating the rotation of the pivotal pawl of the lock, with their respective cooperating slots, locking pins, and abutment pin;

FIG. 8 is a side view with portions broken away to illustrate how a clear plastic, optionally covered waterproof liner, is used within the travel safe of another embodiment having equal sized top and bottom proportions, for the convenient lift out inspection and selection of the traveler's valuable items, indicating how the bottom of this liner is formed to accommodate the interfitting securement subassembly and securement units of still another embodiment, i.e. the upright stud embodiment; and FIG. 9 is a partial side view, with portions broken away, to show the installation of anti bolt cutter guards made of hardened steel to protect a shackel securement locking of a travel safe, and the washers used have sealing rings, to continue the weatherproofing of the travel safe.

DESCRIPTIONS OF THE PREFERRED EMBODIMENTS

The portable strong travel safe used by travelers to keep their essential valuables under their personal control enroute to and from a destination and while staying there is illustrated in various embodiments throughout the drawings. In each embodiment, the traveler's valuables may be locked within the travel safe, which is hand held and/or carried, or the travel safe, loaded with such valuables, may be secured to a securement unit at a place or on a vehicle, to keep the traveler's cash, credit cards, travelers' checks, tickets, jewelry, keys, camera, lens, etc., well-protected from the wrongful acts of the quick break in, quick search, quick taking, thieves, and from adverse weather.

In FIGS. 1, 2 and 3, the overall integrated system involving various installations is illustrated, whereby the traveler may secure his or her travel safe 20, respectively to furniture 22 in a hotel room 24, which furniture in turn has been provided with a strong insert 26, providing a securement unit not shown, such as a stud, or a recess to receive a headed fastener, not shown. Or the traveler may secure his or her travel safe 20 to the framework of a vehicle 28. Moreover, the traveler may secure his or her travel safe 20 to a tree-like strong support 30 having branches 32, equipped with securement units 34. Preferably, the tree-like strong support 30 is embedded in concrete 36 in the ground 38 at its lower end, in parks, at beaches, etc.

A selected embodiment of the travel safe 20 is illustrated in FIG. 4, whereby it is secured at its bottom to a simulated branch 32 of a tree-like strong support 30. A headed bolt 40 is removed from the interior of the travel safe from among components of a securement subassembly 42, and inserted into the securement unit 34, i.e. a recess in the branch 32. The strong cylindrical compartment 44, with a full top entry 46, and in this embodiment, having a limited access opening 48 in the bottom 50, is placed down over the upstanding end 52 of the headed bolt 40. As shown in FIG. 4, the upstanding end 52 is not threaded but it is equipped with a transverse hole 54. After a washer 56 is dropped over the bolt 40, a strong hair pin cotter 58 is in part inserted through and in part secured around the upstanding end 52 of the bolt 40, thereby securing the strong cylindrical compartment 44 to the rectangular branch 32 of the tree like support 30, preventing any unwanted successful twisting and/or pulling forces. Optionally the upstanding end 52 of the bolt 40 is threaded and a nut is threaded around the bolt 40 to secure the strong cylindrical compartment 44 in place, not shown.

Another selected embodiment of the travel safe 20 is illustrated in FIG. 5, whereby it is secured at its top to a simulated round branch 33 of a tree-like support 30, wherein the round branch ends are equipped with blocking end caps 60, preventing the endwise removal of travel safes secured to these branches. Shackles 62 are adjustably secured around the round branches 33 to snugly fit them, while being blocked by the end caps 60. On the inside of the first rotatable then lift off strong waterproof cover 64, the respective threaded ends 66 of the shackles 62 passing through restrictive holes 68 receive washers 70 equipped with sealing rings and then are tightened in place by turning the wing nuts 72. Such mounting may also be made to branches of live trees.

Whether the securement of the weatherproof travel safe 20 is undertaken at the top or the bottom via complementing securement subassemblies 42 and their respective securement unit 34, as shown in FIGS. 4 and 5, these overall securement components become unaccessible, when the strong cover is dropped down and rotated into place and then locked, as illustrated via the exploded view of the weatherproof travel safe in FIG. 6, and the partial view, with portions broken away in FIG. 7 of the locking mechanism 74.

On the inside of each strong cover 64 are strong, preferably integral radially projecting locking pins 76 with integral heads 78, such as the three locking pins 76 shown in FIG. 6. They are located just above the lower edge 80 of the cover 64 and are well concealed when the travel safe 20 is locked. These integral heads 78 are mushroom like heads 78, having an outside diameter which is substantially larger than the diameter of receiving slots 82. Thus, these integral enlarged heads 78 substantially prevent any successful prying off attempts by a wrongdoer trying to separate the top 64 from the bottom 44 of the travel safe 20. To complementarily receive and guide these locking pins 76, as shown in FIGS. 6 and 7, drop in and turn receiving slots 82 are formed around the top end 84 of the strong cylindrical receiving compartment 44. Preferably, the slots in their turning portions 86 are slanted upwardly. The drop in portions 88 are made sufficiently deep to create a safe overlap of the strong cover 64 over the strong cylindrical compartment 44, and at the same time concealing these interfitting structures, i.e. the locking pins 76 and slots 82, when the travel safe is viewed from outside. Moreover the overlap insures the continuity of the weatherproofing of the travel safe 20.

The further completion and final securement of the travel safe 20 is then undertaken, as illustrated in FIG. 7, after the locking pins 76 are dropped in and turned in the slots 82, as the locking pawl 90 of a key actuated lock 92, mounted in the wall 94 of the cylindrical compartment 44, is rotated, just clearing one of the locking pins 76, which has traveled up the respective slanted turning portion 86 of a slot 82. At this selected lock location, an integral abutment pin 96 is formed on the interior of the strong cylindrical receiving compartment 44, to meet the locking pawl 90 at its end of travel in the locking position of the key actuated lock 92. With this integral abutment pin 96 on one side of the locking pawl 90 and the integral locking pin 76 on its other side, the overall locking capacity of the locking mechanisms of this key 93 actuated lock 92 is substantially enhanced, and the weatherproof travel safe 20 remains closed to the quick attempted break in by a thief.

For production die cost reasons and/or also the ease of storage or carrying the travel safe empty in other containers or bags, the height of the strong cover 65 is made equal to the depth of the strong cylindrical receiving compartment 45 in the embodiment illustrated in FIG. 8. As particularly useful in conjunction with this embodiment, but also useful in conjunction with any embodiment is a transparent convenient lift out liner 98, manipulated for the inspection and selection of the traveler's valuable items. Preferably, it has a tight fitting cover 100 making the combined liner 98 and cover 100 a waterproof container 101. Also when the travel safe 20 is to be secured at its bottom and the securement subassembly components 42 and/or the securement unit 34, such as an upright pin or stud 102, protrude up into the receiving volume of the strong cylindrical compartment 44, then this transparent liner has its bottom 104 specially formed in the center into a cone 106, as illustrated in FIG. 8, to fit around such securement components.

Although all the essential components providing the safety aspects of the weatherproof travel safe 20 will be made of strong metals, plastics, or composites, further precautions are undertaken in one embodiment, as illustrated in FIG. 9, wherein anti bolt cutter guards 108 are made integrally with the strong cover 64 to further protect the shackle 62. They are made of hardened steel.

When a handle 39 is not to be adjustable for attachment to a branch of a fabricated tree or of a live tree, then such handle 39 is secured to the strong cover 64 by using shearable attaching screws 41. Therefore any attempted severe prying or turning force applied via the handle 39 will result in the handle 39 being removed, i.e. sheared off, before any other destruction occurs to the travel safe 20, which still continues to protect the traveler's valuables.

Throughout the embodiments, the principal objective is foremost of providing the traveler with an overall security system, where he or she will hand carry their traveling valuables, or he or she will temporarily secure them to strong receiving supports, all via the lockable weatherproof travel safe, which always in its securement to strong supports, conceals the complementing securement subassembly carried by the traveler within the travel safe and the securement unit provided to the traveler. Such securement units, often pins or strong recessed structures, will be provided at and by the traveling facilities, i.e. the rental cars, hotel rooms, airports, parks, beaches, etc., so the traveler will be able to complete a trip without the danger of being successfully robbed by a quick acting thief, whose objective is to wrongfully obtain, money, jewelry, keys, cameras, lenses, credit cards, travelers' checks, airline tickets, etc. These trip-like security advantages may also be realized in and about a person's home, office, or business, and/or nearby daily undertakings, when such selected often used valuables may be secured from loss by local thieves.

Although these weatherproof travel safes 20 may be owned and carried by the traveler, other travel safes 20 may be always hard mounted, i.e. well secured, in rental cars, hotel rooms, etc., to be used by a traveler, who is not carrying a travel safe between destinations.

Moreover, the weatherproof advantages of the travel safe will keep the important traveling valuables from being ruined during times of adverse wet weather, while always keeping them secure from theft and/or misplacement, etc.

I claim:

1. A hand carried and/or hard mounted, strong, lockable, weatherproof, portable travel safe used by travelers to keep their essential valuables under their personal control enroute to and from a destination and while staying there, or just staying there, comprising:
   (a) a strong cylindrical compartment with a full top entry, having about its top edge multiple circumferentially spaced drop in and turn receiving slots and having an integral inside radially projecting abutment pin located adjacent one of the spaced drop in and turn receiving slots;
   (b) a first rotatable then lift off strong cover fully fitting over the full top entry to complete a weatherproof compartment, having about its interior multiple circumferentially spaced integral radially projecting locking pins, each having integral enlarged heads, whereby these locking pins are dropped in and turned in the spaced drop in and turn receiving slots, when the first rotatable then lift off strong cover is fully fitted over the full top entry of the strong cylindrical compartment; and (c) a locking mechanism essentially secured to the strong cylindrical compartment having a rotatable locking pawl, which after the drop in and turn of the strong cover, is rotated past one of the integral radially projecting locking pins of the strong cover, and into contact with the integral inside radially projecting abutment pin of the strong cylindrical compartment, whereby, when the locking mechanism is internally secured to prevent its rotation and consequently also the rotation of the rotatable locking pawl secured to it, the strong cover is firmly and securely locked on the strong cylindrical compartment, because thereafter any attempted relative first rotation of the strong cover is prevented by the overall arrangement of the locking pawl, which is then located between the integral inside radially projecting abutment pin and the nearest one of the integral radial projecting locking pins, and thereafter any access is prevented to all the valuable contents placed in the strong cylindrical compartment of this travel safe.

2. A hand carried travel safe, as claimed in claim 1, having a securement subassembly which is carried within each travel safe, and when a destination is reached and the travel safe is not to be eventually personally viewed by the owner for a while, then this securement subassembly is arranged to be firmly fastened to a securement unit, furnished at a respective place, such as a hotel room, rental car, beach, park, airport.

3. A hand carried travel safe, as claimed in claim 2, wherein the securement subassembly comprises a hole in the bottom of the strong cylindrical compartment, a bolt with a head adapted to be confined about its head by a securement unit at a destination and with the then upstanding body of the bolt to be positioned up through the hole in the bottom, and a positioning member to keep the upstanding body of the bolt securely within the strong cylindrical compartment so when the travel safe is locked with the strong top in place, the securement subassembly is inaccessible, whereby the travel safe is then firmly secured to a securement unit at a destination.

4. A hand carried travel safe, as claimed in claim 3, in combination with a tree-like arrangement of multiple complementary securement units with recesses to accept a bolt head of a securement subassembly, collectively well secured at spaced locations, with this overall tree-like arrangement being well-anchored at its bottom at ground level and below.

5. A hand carried travel safe, as claimed in claim 3 wherein the securement subassembly includes washers equipped with sealing rings, and/or strong hair pin cotter.

6. A hand carried travel safe, as claimed in claim 2, wherein the securement subassembly comprises a shackle, also serving at optional times as a handle, which is threadably adjustable in height above the top of the strong cover by passing its lower ends through holes in the cover and then having these lower ends threadably secured in place by wing nuts tightened about the threaded ends of the shackle that are inside the strong cover, and when the shackle has first been placed around a securement unit before tightening, then later, upon locking the cover and cylindrical compartment together, the travel safe is then firmly secured to the securement unit at a destination.

7. A hand carried travel safe, as claimed in claim 6, having also an alternate securement subassembly comprising a hole in the bottom of the strong cylindrical compartment, a bolt with a head adapted to be confined about its head by a securement unit at a destination and with the then upstanding body of the bolt alternately to be positioned up through the hole in the bottom, and a positioning member to keep the upstanding body of the bolt securely within the strong cylindrical compartment, so when the travel safe is locked with the strong top in place, this alternate securement subassembly is inaccessible, whereby the travel safe is then firmly secured to a securement unit at a destination.

8. A hand carried travel safe as claimed in claim 6, in combination with a tree-like arrangement of multiple complementary securement units each being a limb-like pipe extending from a trunk-like stanchion, and terminating in a blocking end cap forming an enlarged end abutment, thereby holding captive wellsecured shackles about the limb-like pipes, with this overall tree-like arrangement being well-anchored at its bottom at ground level and below.

9. A hand carried travel safe, as claimed in claim 2, in combination with a tree-like arrangement of multiple complementary securement units, collectively well-secured at spaced locations, with this overall tree-like arrangement being well anchored at its bottom at ground level and below.

10. A travel safe, as claimed in claim 1, wherein the strong compartment and strong cover are both made of waterproof material and when they are assembled the travel safe is weatherproof.

11. A travel safe, as claimed in claim 1, wherein a waterproof two piece plastic liner is directly filled with the traveler's valuables for insertion into the strong compartment of the travel safe.

12. A hand carried and/or hard mounted, strong, lockable, weatherproof, portable travel safe used by travelers to keep their essential valuables under their personal control enroute to and from a destination and while staying there, or just staying there, comprising:

(a) a strong cylindrical compartment with a full top entry, having about its top edge multiple circumferentially spaced drop in and turn receiving slots and having an integral inside radially projecting abutment pin located adjacent one of the spaced drop in and turn receiving slots;

(b) a first rotatable then lift off strong cover fully fitting over the full top entry to complete a weatherproof compartment, having about its interior multiple circumferentially spaced integral radially projecting locking pins, each having integral enlarged heads, whereby these locking pins are dropped in and turned in the spaced drop in and turn receiving slots, when the first rotatable then lift off strong cover is fully fitted over the full top entry of the strong cylindrical compartment; and (c) a locking mechanism essentially secured to the strong cylindrical compartment having a movable component thereof, which after the drop in and turn of the strong cover, is moved between one of the integral radially projecting locking pins of the strong cover and the integral inside radially projecting abutment pin of the strong cylindrical compartment, whereby when the locking mechanism is internally secured to prevent its movement and consequently the movement of the movable component secured to it, the strong cover is firmly and securely locked on the strong cylindrical compartment, because thereafter any attempted relative first rotation of the strong cover is prevented by this overall arrangement of the movable component of the locking mechanism, which is then positively located between the integral inside radially projecting abutment pin and the nearest one of the integral radial projecting locking pins, and thereafter any access is prevented to all the valuable contents placed in the strong cylindrical compartment of this travel safe.

* * * * *